United States Patent [19]

Mazziotti et al.

[11] Patent Number: 4,589,856
[45] Date of Patent: May 20, 1986

[54] TRIPOT UNIVERSAL JOINT OF THE END MOTION TYPE

[75] Inventors: Michael F. Mazziotti; Philip J. Mazziotti, both of Toledo, Ohio

[73] Assignee: The Zeller Corporation, Defiance, Ohio

[21] Appl. No.: 706,670

[22] Filed: Feb. 28, 1985

[51] Int. Cl.⁴ .............................................. F16D 3/20
[52] U.S. Cl. ................................. 464/111; 384/568; 464/123; 464/132; 464/905
[58] Field of Search ............... 464/111, 123, 124, 132, 464/905; 308/213, 215; 384/565, 568

[56] References Cited

U.S. PATENT DOCUMENTS

| | | | |
|---|---|---|---|
| 1,646,947 | 10/1927 | Armstrong | 384/568 |
| 1,781,886 | 11/1930 | Scribner | 384/568 X |
| 3,332,256 | 7/1967 | Mazziotti | 464/152 |
| 3,333,440 | 8/1967 | Sharp | 464/152 |
| 3,643,468 | 2/1972 | Kleinschmidt et al. | 464/124 |
| 3,818,721 | 6/1974 | Wahlmark | 464/111 |
| 4,091,641 | 5/1978 | Welschof | 464/111 |
| 4,192,154 | 3/1980 | Nakamura et al. | 464/111 |
| 4,379,706 | 4/1983 | Otsuka et al. | 464/111 |

FOREIGN PATENT DOCUMENTS

| | | | |
|---|---|---|---|
| 359464 | 9/1922 | Fed. Rep. of Germany | 384/565 |
| 55-36614 | 3/1980 | Japan | 464/111 |
| 55-54721 | 4/1980 | Japan | 464/111 |
| 2099549 | 12/1982 | United Kingdom | 464/111 |

Primary Examiner—Stuart S. Levy
Assistant Examiner—Daniel P. Stodola
Attorney, Agent, or Firm—Allen D. Gutchess, Jr.

[57] ABSTRACT

A tripot universal joint of the end motion type is provided. The joint includes a first shaft with a cup-shaped member at one end having three axially-extending, parallel grooves in its inner periphery. Another shaft has a spider at one end with three trunnions extending radially outwardly. A roller is mounted on each trunnion for slidable, rotatable, and pivotal movements with respect to the trunnion. The roller is maintained with its axis perpendicular to the associated groove, even when the spider shaft is positioned at a substantial angle to the axis of the first shaft and the cup-shaped member. The roller mounting includes a guide ring slidably mounted on the trunnion for axial movement with respect thereto, the guide ring having an outer segmental spherical surface. Bearings having surfaces formed by a curved generatrix with a radius extending away from the longitudinal axis of the bearings and being substantially equal to the radius of the spherical surface of the guide ring are located around the guide ring which forms an inner race. The roller is positioned around the bearings and forms an outer race. The annular surface of the roller adjacent the bearings can be curved in transverse cross section to fully support the bearings. The surface can also be flat in transverse cross section to support end portions of the bearings. In that instance, the bearings have generally cylindrical end portions engaged by the flat surface of the roller for support.

9 Claims, 5 Drawing Figures

TRIPOT UNIVERSAL JOINT OF THE END MOTION TYPE

This invention relates to a tripot universal joint with improved means for mounting rollers on trunnions for slidable, rotatable, and pivotal movement thereon.

Most tripot universal joints of the end motion type have had rollers mounted on trunnions of a spider for only slidable and rotatable movement with respect thereto. Universal joints of this type include a first shaft with a cup-shaped member at one end having three axially-extending, parallel grooves in the inner periphery. The joint has a second shaft with a spider at one end from which three trunnions extend radially outwardly, with rollers mounted on the trunnions in a manner to allow axial and rotational movement of the rollers relative to the trunnions. With these universal joints, as the angle between the first and second shafts increases, the rollers are correspondingly at greater angles to the grooves, resulting in excess slippage which causes problems such as friction, heat generation, vibration, and loss of power.

Attempts have been made heretofore to mount the rollers on the trunnions for pivotal or rocking movement as well as slidable and rotatable movement. Such attempts are shown in U.S. Pat. No. 3,332,256, issued July 25, 1967; U.S. Pat. No. 3,333,440, issued Aug. 1, 1967; U.S. Pat. No. 4,091,641, issued May 30, 1978; and U.S. Pat. No. 4,192,154, issued Mar. 11, 1980. The roller mounts shown in these patents have tended to have certain deficiencies, such as being structurally weak, impractical, or requiring too many parts, resulting in excessive tolerance variations, high costs, and assembly problems.

A universal joint of the sliding or end motion type in accordance with the invention includes trunnions with guide rings slidably mounted thereon and having outer, segmental spherical surfaces. Bearings are located around each guide ring which forms an inner race and a roller is positioned around the bearings and forms an outer race. The bearings are of circular transverse cross section through their length and of diminishing diameter from outer end portions to an intermediate portion. More specifically, the bearing surfaces are formed by a curved generatrix with a radius extending away from the longitudinal axis of the bearing and being substantially equal in length to the radius of the segmental spherical surface of the guide ring. The bearings can also have cylindrical end portions and two rows of bearings can be provided around the guide ring, if desired. The guide ring and bearings are the only components required for mounting the roller on the trunnion for slidable, rotational, and pivotal or rocking movement.

It is, therefore, a principal object of the invention to provide a tripot universal joint of the end motion type having an improved mounting arrangement for mounting rollers on trunnions of the joint for slidable, rotational, and pivotal movement with respect to the trunnions.

Many other objects and advantages of the invention will be apparent from the following detailed description of preferred embodiments thereof, reference being made to the accompanying drawings in which.

Figure 1:
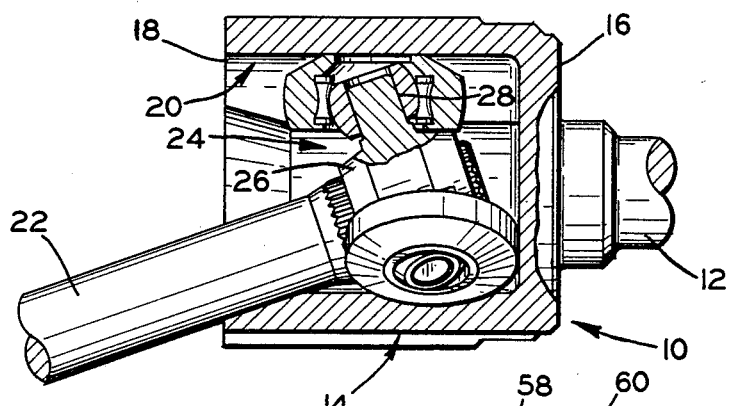
FIG. 1 is a somewhat schematic, fragmentary view in elevation, with parts broken away and with parts in section, of a tripot universal joint embodying the invention.

Referring particularly to FIG. 1, a tripot universal joint of the end motion type embodying the invention is indicated at 10. The joint 10 includes a first shaft 12 having a cup-shaped member 14 at one end, the member having a closed end 16 and an open end 18. The cup-shaped member 14 has a plurality of, in this instance, three, axially-extending, parallel grooves 20 extending from the open end 18 toward the closed end 16 and uniformly spaced around the inner periphery of the member 14.

A second shaft 22 of the joint 10 has a spider 24 at one end, with a hub 26 affixed to that end with three trunnions or pods 28 extending radially outwardly therefrom.

Figure 2:
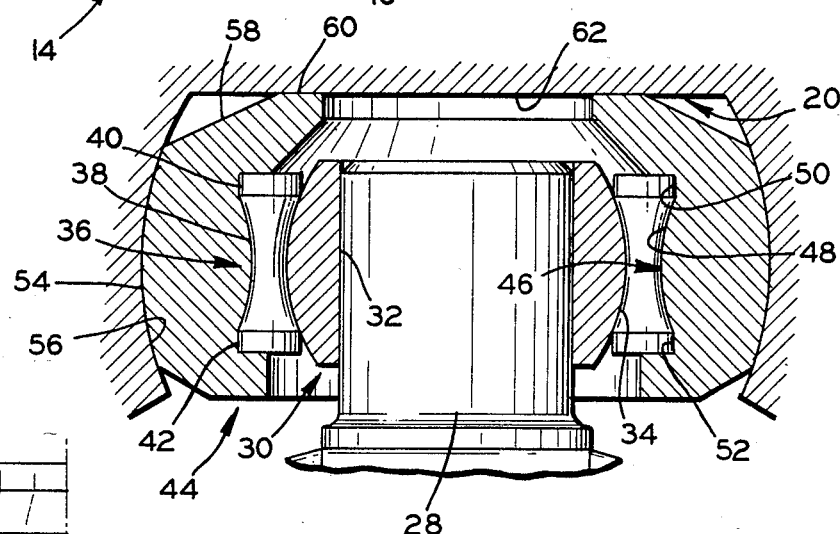
FIG. 2 is a greatly enlarged view in transverse cross section taken through part of the universal joint of FIG. 1 but with a trunnion being disposed perpendicular to a groove of the joint.

As shown more particularly in FIG. 2, the trunnion 28 has a guide ring 30 slidably mounted thereon with an inner bore or passage 32 having a cross-sectional shape similar to the shape of the trunnion 28. The guide ring 30 has an outer, segmental spherical surface 34, as viewed in longitudinal section. The radius of the spherical surface 34 of the guide ring 30 has a center which lies on the axis of the trunnion 28.

Bearings 36, there being typically eighteen of them, are disposed around the guide ring 30 which forms, in effect, an inner race for the bearings. Each of the bearings 36 is circular in transverse cross section and has an outer surface 38 of diminishing diameter from outer end portions to a central or intermediate portion. The surface 38 can be formed by a curved generatrix having a radius extending away from the longitudinal axis of the bearing and being substantially equal in length to the radius of the segmental spherical surface 34 of the guide ring 30, with the center of the radius being on the axis of the trunnion 28. As shown, the bearings 36 also have generally cylindrical end portions 40 and 42.

A roller 44 is located around the bearings 36 and the guide ring 30, forming an outer race for the bearings. The roller 44, in this instance, has an inner, annular groove 46 which has an intermediate arcuate portion 48 of the same radius as the roller surface 38 and has cylindrical end grooves 50 and 52 which receive or provide clearance for the cylindrical end portions 40 and 42 of the bearings 36. The roller 44 also has an outer or peripheral surface 54 having a shape similar to the shape of side walls 56 of the groove 20. In this instance, both are of segmental spherical shape. The roller 44 also has an annular extension 58 extending beyond the bearings 36 and the guide ring 30 and forming a flat annular surface 60. This surface can contact a bottom wall 62 of the groove 20 to maintain the axis of the roller 44 generally perpendicular to the longitudinal extent of the groove 20.

Figure 3:
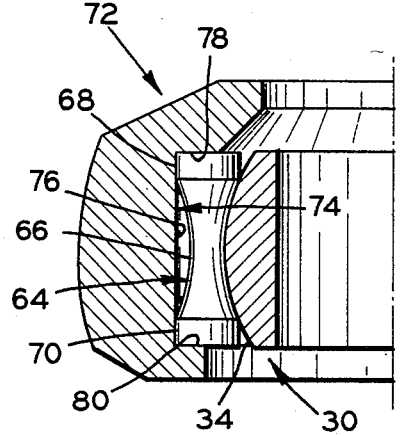
FIG. 3 is a view in transverse cross section of part of a slightly modified mounting arrangement for mounting rollers on trunnions.

A slightly modified mounting arrangement shown in FIG. 3 includes the guide ring 30 and modified bearings 64. The bearing 64 has an outer surface 66 similar to the surface 38 of the bearing 36, with this surface substantially fully engaging the segmental spherical surface 34 of the guide ring 30. The bearing 64 also has generally cylindrical end portions 68 and 70 which are wider than the corresponding surfaces 40 and 42 of the bearing 36.

A slightly modified roller 72 forms an outer race for the bearings 64 and has an inner, annular grove 74. The groove 74, in this instance, has an intermediate cylindrical portion 76 with annular end shoulders 78 and 80. While the groove 46 of the roller 44 fully backs up the peripheral surfaces of the bearings 36 along a line diametrically opposite the line of contact of the bearings with the guide ring 30, the flat cylindrical surface 76 of the annular groove 74 only supports the cylindrical end portions 68 and 70 of the bearings 64. However, the wider cylindrical end portions 68 and 70 provide more support for the bearings than their counterparts in FIG. 2. Further, the groove 74 is easier to machine or otherwise form than the groove 46 of FIG. 2.

Figure 4:
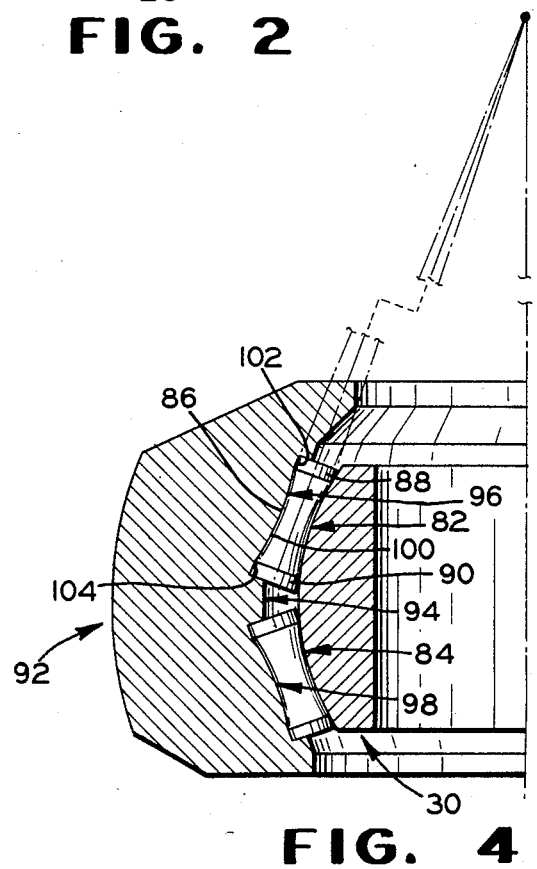
FIG. 4 is an enlarged view similar to FIG. 3 of another slightly modified mounting arrangement.

Another slightly modified mounting arrangement is shown in FIG. 4. In this instance, the guide ring 30 can again be used. Two rows of bearings 82 and 84 are in contact with the segmental spherical surface 34 of the ring 30 which again forms an inner race for the bearings. The bearings 82 and 84 can be identical but are smaller in diameter at one end than the other, unlike the bearings 36 and 64 of FIGS. 2 and 3. The bearings 82 and 84 have curved outer surfaces 86 which can be generated similar to the surfaces of the bearings 36 and 64 but with one end larger than the other. The bearings 82 and 84 have smaller, generally cylindrical end portions 88 at one end and larger generally cylindrical end portions 90 at the other end. More precisely, both end portions are of truncated conical shape. As shown, lines extending through the end portions 88 and 90 and an axis of the bearing 82 or 84 terminate at a common point or extrapolated apex which lies on the axis of the trunnion 28.

A roller 92, in this instance, has a main annular groove 94 in which are formed two narrower annular grooves 96 and 98, each having an intermediate arcuate portion 100 of the same radius as the roller surfaces 86 and end grooves 102 and 104 which receive or provide clearance for the generally cylindrical end portions 88 and 90 of the bearings 82 and 84.

Figure 5:
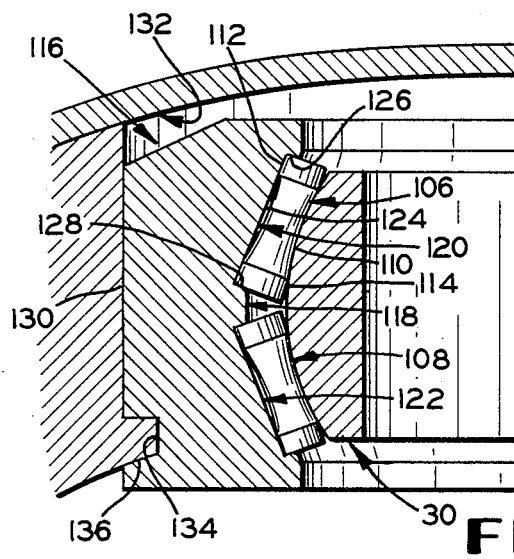
FIG. 5 is a view similar to FIG. 4 of still another slightly modified mounting arrangement.

A further slightly modified mounting arrangement is shown in FIG. 5. In this instance, the guide ring 30 can form an inner race for bearings 106 and 108 which can be identical. These bearings have curved outer surfaces 110 similar to the surfaces 86 of the bearings 82 and 84. However, the bearings 106 and 108 have wider generally cylindrical end portions 112 and 114, the latter being larger in diameter than the former, and with both being more precisely of truncated conical shape.

A roller 116 forms an outer race for the bearings 106 and 108, having a main annular groove 118 and two narrower grooves 120 and 122. The grooves 120 and 122 have annular, conical surfaces 124 which are flat as viewed in transverse cross section and do not back up the surfaces 110 of the bearing 106 and 108 as do the arcuate portions 100 of the grooves 96 and 98 of FIG. 4. The grooves 120 and 122 also have end shoulders 126 and 128 to aid in confining the bearings 106 and 108. While the grooves 120 and 122 do not fully support the bearings, the wider cylindrical end portions 112 and 114 provide greater support than the cylindrical end portions 88 and 90 of the bearings 82 and 84. Further, the grooves 120 and 122 in the main annular groove 118 are easier to machine or otherwise form. The roller 116, in this instance, has a cylindrical outer surface 130 for a groove 132 having straight side walls. The roller 116 also has an annular groove 134 which cooperates with a shoulder or ridge 136 on the groove 132 to maintain the perpendicular position of the roller relative to the groove. Other configurations can also be used to accommodate the particular position of the roller relative to the groove.

From the above, it will be seen that the tripot universal joint according to the invention has a number of advantages over those heretofore known. The roller mount enables the roller to always be maintained with its axis perpendicular to the longitudinal extent of the groove in which it is received, regardless of the angles between the shafts of the joint. The roller mount is structurally strong and, in particular, requires fewer number of parts or components so that costs are reduced, assembly problems are minimized, and previous excessive tolerance variations are overcome.

Various modifications of the above-described embodiments of the invention will be apparent to those skilled in the art and it is to be understood that such modifications can be made without departing from the scope of the invention, if they are within the spirit and the tenor of the accompanying claims.

We claim:

1. In a slidable universal joint of the end motion type having an outer cup-shaped member with an open end and a closed end, a plurality of axially-extending grooves positioned substantially parallel to one another and extending toward the closed end from the open end, a shaft having a spider affixed to an end portion thereof, said spider having a plurality of radially-extending trunnions, there being one for each of said grooves, a guide ring located on each of said trunnions for slidable movement therealong, each of said rings having an outer surface of segmental spherical shape, a plurality of bearings located around each of said rings, each of said bearings being of circular transverse cross section throughout its length and of diminishing diameter from outer end portions to a central portion, each of said bearings having a substantially cylindrical end portion beyond each of said outer end portions, the diameters of said outer end portions not exceeding the diameters of said substantially cylindrical end portions whereby the substantially cylindrical end portions of adjacent bearings can contact one another during operation of the universal joint, and a roller around each of said rings and said plurality of bearings and contacting and supporting peripheral surfaces of said bearings, said roller having means defining an inner annular groove with annular end shoulders adjacent ends of said substantially cylindrical end portions to aid in confining said bearings in said annular groove.

2. A universal joint according to claim 1, characterized by each of said rollers having an annular portion extending beyond an end of the corresponding trunnion to substantially prevent rocking of said roller and said bearings relative to the groove.

3. A universal joint according to claim 1 characterized by each of said rollers having a peripheral outer shape similar to the shape of side walls of the corresponding groove.

4. A universal joint according to claim 1 characterized by said rollers contacting and supporting the substantially cylindrical end portions of said bearings.

5. A universal joint according to claim 1 characterized by there being two rows of said plurality of bearings around each of said rings.

6. A universal joint according to claim 5 characterized by each of said rollers having two inner annular grooves therein which contact and support peripheral surfaces of said bearings in said two rows.

7. A universal joint according to claim 1 characterized by said inner annular groove having a generally cylindrical shape contacting and supporting the substantially cylindrical end portions of said bearings.

8. In a slidable universal joint of the end motion type having an outer cup-shaped member with an open end and a closed end, a plurality of axially-extending grooves positioned substantially parallel to one another and extending toward the closed end from the open end, a shaft having a spider affixed to an end portion thereof, said spider having a plurality of radially-extending trunnions, there being one for each of said grooves, a guide ring located on each of said trunnions for slidable movement therealong, each of said rings having an outer surface of segmental spherical shape, a plurality of bearings located around each of said rings, each of said bearings being of circular transverse cross section throughout its length and of diminishing diameter from outer end portions to a central portion, each of said bearings having a substantially cylindrical end portion beyond each of said outer end portions, the diameters of said outer end portions not substantially exceeding the diameters of said substantially cylindrical end portions whereby the substantially cylindrical end portions of adjacent bearings can contact one another during operation of the universal joint, and a roller around each of said rings and said plurality of bearings and contacting and supporting peripheral surfaces of said bearings, said roller having an inner annular groove with a flat bottom as viewed in transverse cross section contacting and supporting only the substantially cylindrical end portions of said bearings, said annular groove having annular end shoulders adjacent ends of said substantially cylindrical end portions to aid in confining said bearings in said groove.

9. A universal joint according to claim 8 characterized by there being two rows of said plurality of bearings around each of said guide rings and each of said rollers having two of said inner annular grooves therein which contact and support only said substantially cylindrical end portions of said bearings.

* * * * *